(12) United States Patent
Kuo

(10) Patent No.: US 8,598,842 B2
(45) Date of Patent: Dec. 3, 2013

(54) POWER SOCKET HAVING FLEXIBLE HOLDING ARM

(75) Inventor: Ming-Chou Kuo, Taipei (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 414 days.

(21) Appl. No.: 12/941,206

(22) Filed: Nov. 8, 2010

(65) Prior Publication Data

US 2012/0062179 A1 Mar. 15, 2012

(30) Foreign Application Priority Data

Sep. 13, 2010 (TW) ................................ 99217703 U

(51) Int. Cl.
*H02J 7/00* (2006.01)
(52) U.S. Cl.
USPC ......................................................... 320/115
(58) Field of Classification Search
USPC ......................................................... 320/115
See application file for complete search history.

(56) References Cited

U.S. PATENT DOCUMENTS

| 5,691,618 | A | * | 11/1997 | Kobayashi et al. | 320/115 |
|---|---|---|---|---|---|
| 2002/0072321 | A1 | * | 6/2002 | Kowalski et al. | 454/155 |
| 2008/0185992 | A1 | * | 8/2008 | Hoffman et al. | 320/110 |
| 2008/0224660 | A1 | * | 9/2008 | Lin et al. | 320/115 |
| 2010/0315041 | A1 | * | 12/2010 | Tan | 320/115 |
| 2011/0095724 | A1 | * | 4/2011 | Byrne | 320/115 |
| 2011/0169451 | A1 | * | 7/2011 | Stampfli | 320/115 |
| 2011/0193513 | A1 | * | 8/2011 | Wagnon et al. | 320/101 |

* cited by examiner

*Primary Examiner* — Arun Williams
(74) *Attorney, Agent, or Firm* — Rosenberg, Klein & Lee

(57) ABSTRACT

A power socket with charging interface is provided, wherein the power socket comprises at least one power hole, at least one charging interface and a holding arm, which holding arm being slidably disposed on the main body of the power socket, and one fixed end of the holding arm and one side of the power socket together constituting a containing slot for accommodating a portable electronic device, in which the holding arm may inwardly or outwardly slide so as to adjust the position of the fixed end. Since the width of the containing slot is adjustable, the power socket is allowable for placement of portable electronic devices of various sizes and specifications.

10 Claims, 7 Drawing Sheets

POWER SOCKET HAVING FLEXIBLE HOLDING ARM

BACKGROUND OF THE INVENTION

1. Field of the Invention

The present invention relates to a power socket having a charging interface; in particular, to a power socket allowable for placement of a portable electronic device by leaning atilt against one side thereof.

2. Description of Related Art

Upon using a conventional power socket to charge a portable electronic device (such as an e-Book or a tablet PC and the like), the power socket and the portable electronic device respectively need to occupy independent space, so it is impossible to lean the portable electronic device slantwise against one side of the power socket for space-saving purpose, thus undesirably causing disorder in user's working environment and inconvenience for user's viewings and operations. Besides, the user also expects to be able to hide the power socket behind the portable electronic device.

In addition, a variety of portable electronic devices have different thicknesses and widths; it is hence desirable to develop an innovative approach to allow various types of portable electronic devices to be placed slantwise against one side of the power socket.

SUMMARY OF THE INVENTION

The present invention discloses a power socket having a charging interface which uses a hold arm and one side of the main body to form a containing slot, so a user can place a portable electronic device uprightly or laterally in the containing slot thereby leaning the portable electronic device atilt against one side of the power socket for saving space and facilitating the user's viewings and operations on the portable electronic device.

The technical means taken by the present invention is a power socket having a charging interface, comprising:

a main body, which includes at least one power hole and at least one charging interface; and a holding arm, which is slidably installed on the main body, and one fixed end of the holding arm and one side of the main body together define a containing slot thereby allowing the user to place a portable electronic device, wherein the position of the fixed end is adjusted by selectively sliding the holding arm outwardly or inwardly. Herein the height of the side is greater than the height of the fixed end, and the side is a slant plane such that the portable electronic device placed in the containing slot inclines toward the side and leans against the side.

Another technical means taken by the present invention is a power socket having a charging interface, comprising:

a main body, which includes at least one power hole and at least one charging interface; and a holding arm having a first sideboard and a second sideboard, in which the first sideboard and the second sideboard are respectively pivoted on two sides of the main body, the rotating range of the holding arm is limited between a top and a side of the main body, and when the holding arm rotates to the side, one fixed end of the holding arm and the side of the main body define a containing slot thereby allowing the user to place a portable electronic device.

Yet another technical means taken by the present invention is a power socket having a charging interface, comprising:

a main body, which includes at least one power hole and at least one charging interface; and a holding arm, which is rotatably pivoted on one side of the main body, in which the rotating range of the holding arm is limited between a first side and a second side of the main body, and when the holding arm rotates to the first side of the main body, one fixed end of the holding arm and the first side of the main body define a containing slot.

An improved effect that the present invention can provide lies in that, the portable electronic device can be placed slantwise against one side of the power socket thereby saving space and preventing disordered working environment; or furthermore even the space formed by the slant of the portable electronic device may be used for hiding the power socket behind the portable electronic device.

Another improved effect that the present invention can provide lies in that, the containing slot in the power socket of the present invention has two opposite open ends, so the user is allowed to place a portable electronic device uprightly or laterally in the containing slot without limits in terms of width or orientation; besides, the user can suitably positioning the fixed end of the holding arm so as to apply the power socket to various portable electronic devices of different widths.

In order to facilitate better understandings of the aforementioned features and advantages of the present invention, preferred embodiments and appended drawings are hereunder specifically provided for descriptions thereof in further details.

DETAILED DESCRIPTION OF THE PREFERRED EMBODIMENTS

First Embodiment

Figure 1:
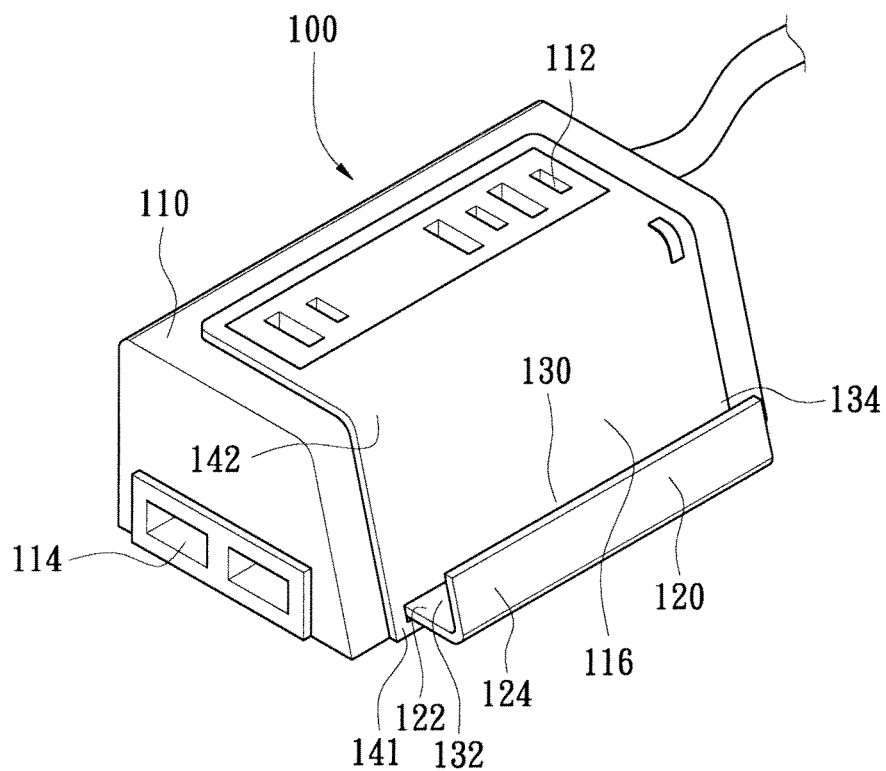
FIG. 1 shows a diagram of a power socket according to a first embodiment of the present invention.

Refer initially to FIG. 1, wherein a diagram of a power socket according to a first embodiment of the present invention is shown. The power socket 100 comprises a main body 110 and a holding arm 120, and the main body 110 has at least one power hole 112 and at least one charging interface 114. The holding arm 120 is slidably disposed on the main body 110, which has a fixed end 124 and a sliding end 122, in which the sliding end 122 is slidably installed inside the main body 110 for driving the fixed end 124. The fixed end 124 and the side 116 of the main body 110 define a containing slot 130 for placing a portable electronic device. The holding arm 120 may slide outwardly or inwardly so as to adjust the position of the fixed end 124, indicating that the width of the containing slot is adjustable for application to portable electronic devices of various sizes, as shown by the dotted line.

The positions of the power hole 112 and the charging interface 114 can be for example on the top and both sides of the main body 110, while the numbers thereof may vary according to design requirements; the power hole 112 can be of 3-poled type or 2-poled type, the charging interface 114 can be such as USB interface (e.g., micro-B or micro-AB), cellular phone charging interface, notebook computer charging interface, iPhone charging interface or iPad charging interface, and the present invention is not limited thereto.

Figure 2:
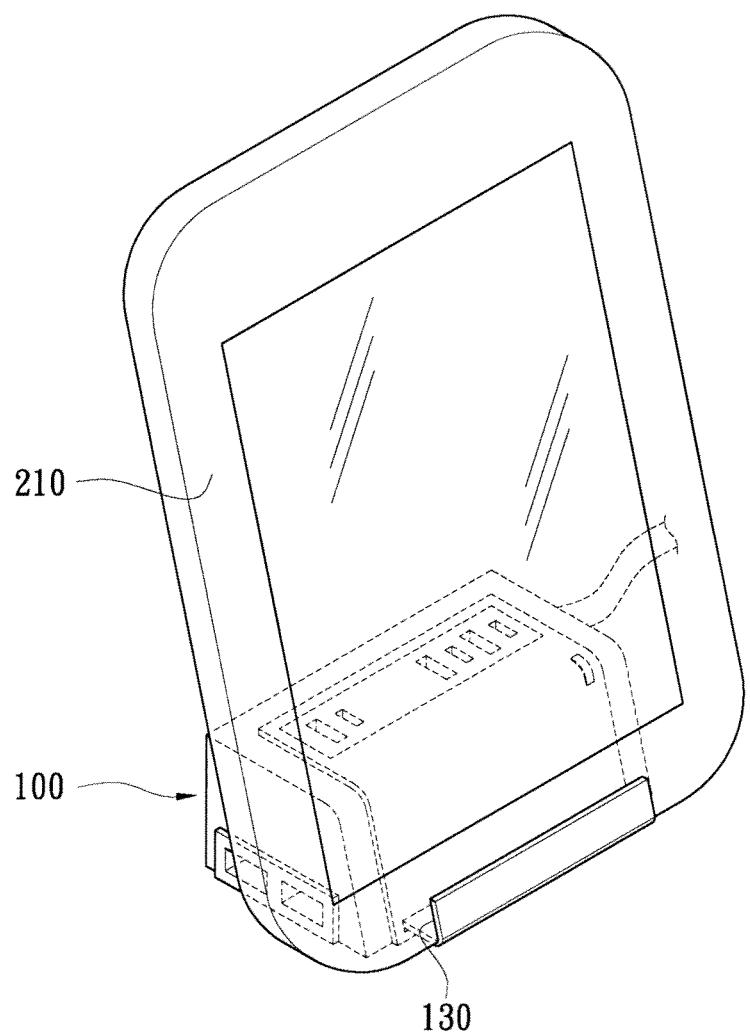
FIG. 2 shows a diagram depicting the placement of a portable electronic device on the containing slot 130.

The side 116 of the main body 110 and the fixed end 124 of the holding arm 120 are slant planes, or both can be designed as mutually parallel, and the present invention is not limited thereto. The side 116 is formed by extending the front edge of bottom 141 in the main body 110 toward the front edge of top 142 in the main body 110. The front edge of bottom 141 in the main body 110 outwardly protrudes relative to the front edge of top 142 in the main body 110, so the side 116 is a slant plane. Since the side 116 and the fixed end 124 are both designed as slant planes, upon placing a portable electronic device on the containing slot 130, the portable electronic device may slightly tilt toward the direction of the side 116 and lean against the side 116, thereby facilitating the user's viewings and operations. Refer also to FIG. 2, wherein a diagram depicting the placement of a portable electronic device on the containing slot 130 is shown. As can be seen, when the portable electronic device 210 is disposed on the containing slot 130 of the power socket 100, it may slightly slant backward and lean against the side 116, thereby not only saving space but preventing messy working environment; or further the space formed by the slant of the portable electronic device 210 can be employed to hide the power socket 100 behind the portable electronic device 210.

Figure 3A:
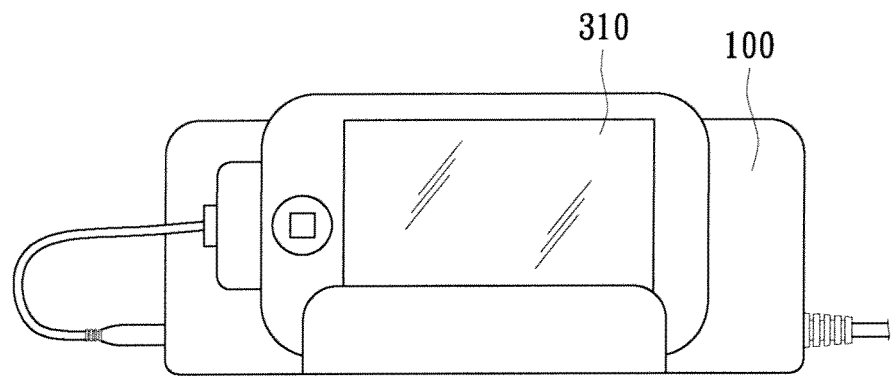
FIGS. 3A and 3B show diagrams depicting the placement of a portable electronic device according to the first embodiment of the present invention.
Figure 3B:
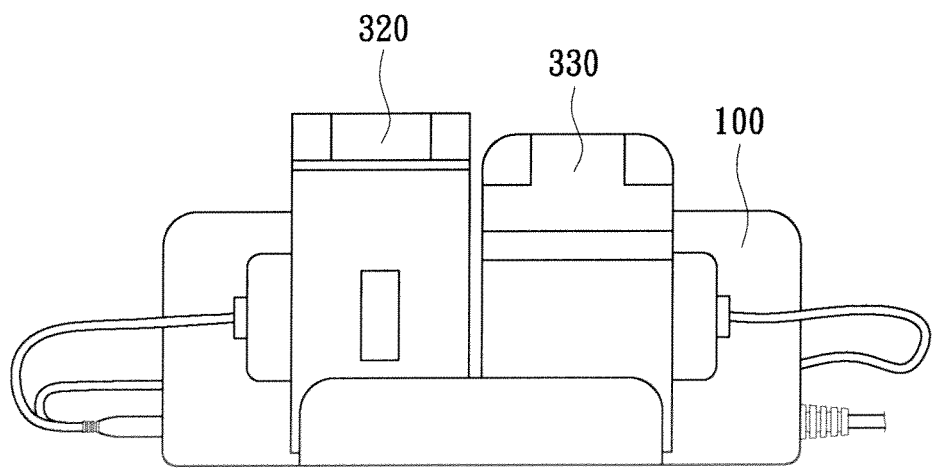

Additionally, since the containing slot 130 has two opposite open ends 132, 134, as shown in FIG. 1, the length of the portable electronic device 210 may exceed the length of the containing slot 130. Meanwhile, the portable electronic device can be placed uprightly or laterally on the containing slot 130, as shown in FIGS. 3A, 3B in which diagrams depicting the placement of a portable electronic device according to the first embodiment of the present invention are shown. The direction of placement for the portable electronic device 310, 320 and 330 is not restricted, indicating that both sides thereof may surpass the containing slot 130, so no limit is imposed on the length of placement. Such a structure design has no restrictions on width and direction when placing in disposal of the portable electronic device 210, 310, 320 and 330. Also, the fixed end 124 of the holding arm 120 can be pulled outwardly to extend the width of the containing slot 130, indicating there is no width limits on placing the portable electronic device. Thus, in design, by means of the sliding holding arm 120, it enables more convenient placement of the portable electronic device 210 for the user.

Figure 4:
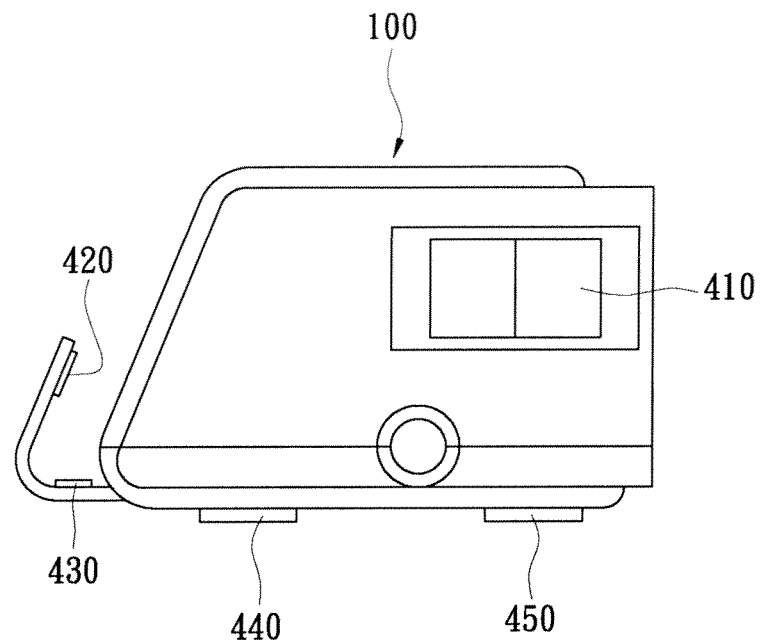
FIG. 4 shows a diagram of the power socket 100 according to the first embodiment of the present invention.

Furthermore, refer to FIG. 4, wherein a diagram of the power socket 100 according to the first embodiment of the present invention is shown. The power socket 100 may be also installed with a power switch 410 for controlling the power supplied to the power hole 112 and the charging interface 114 on the power socket 100. The present embodiment does not limit the installation position and type of the power switch 410 which may be e.g., a touch switch. The inner sidewall or bottom of the holding arm 120 can be installed with cushions 420, 430 for protection of the portable electronic device, and the bottom of the main body 110 can be installed with an anti-skid pad 440, 450. The number, shape and material of said cushions and anti-skids are not limited in the present embodiment.

There is provided a positioning mechanism inside the main body 110 for positioning the location of the holding arm 120 to prevent possible slides in placement of the portable electronic device. The positioning mechanism can be composed of the structure of the sliding end 122 of the holding arm 120 along with certain elements within the main body 110, such as a spring, buckle, button or push-push typed position mechanism. A few designs for the positioning mechanism are exemplarily illustrated as follows in the present disclosure, but the present invention is by no means limited thereto.

Figure 5A:
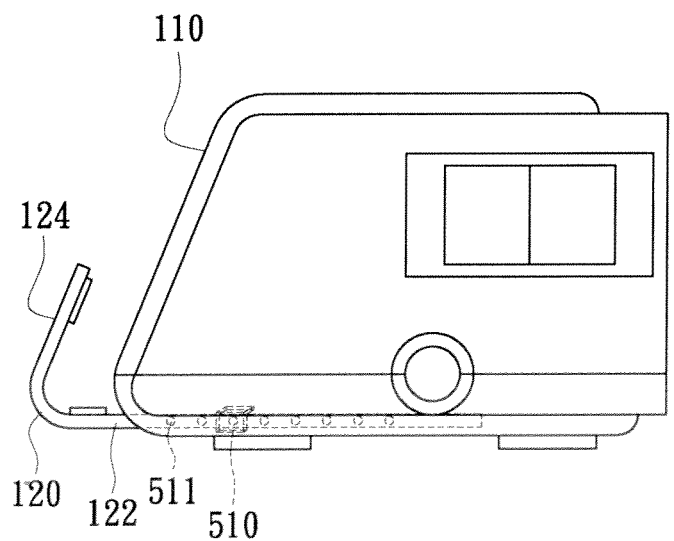
FIGS. 5A-5C show diagrams of the positioning mechanism according to the first embodiment of the present invention.
Figure 5B:
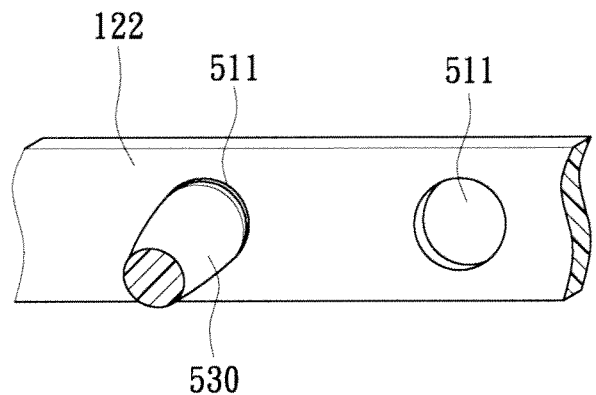
Figure 5C:
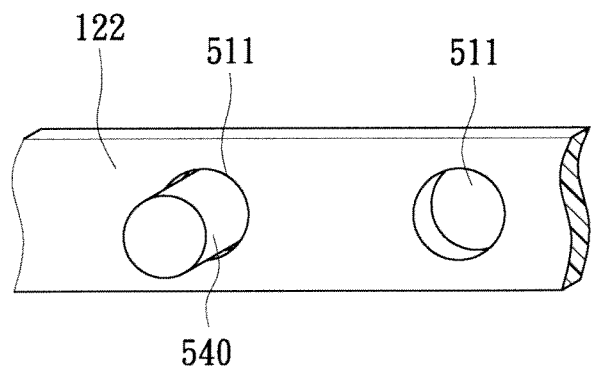

First of all, refer to FIGS. 5A-5C, wherein diagrams of the positioning mechanism according to the first embodiment of the present invention are shown. The sliding end 124 of the holding arm 120 is slidably disposed within the main body 110, in which a plurality of positioning holes 511 are formed on the sliding end 124, and a positioning element 510 is installed correspondingly in the main body 110 for embedding into one of such positioning holes 511. The positioning element 510 can be embedded into one of the positioning holes 511 by using a ball-shaped positioning end 530 or a positioning rod 540 so as to stably position the holding arm 120, as shown in FIGS. 5B, 5C. The ball-shaped positioning end 530 and the positioning rod 540 may also use a spring (not shown) to exert an elastic force for embedding into the position hole 511, or otherwise manual operations can be applied thereto for controlling the release of interference between the positioning element 510 and the sliding end 124.

Figure 6:
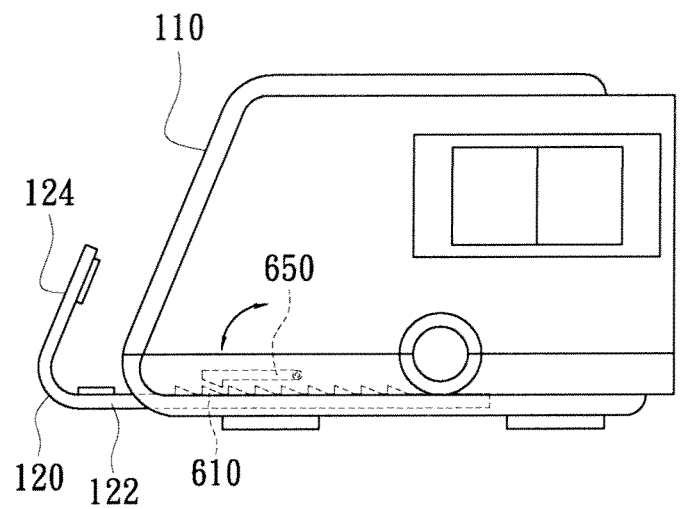
FIG. 6 shows a diagram of the positioning mechanism according to another embodiment of the present invention.
Figure 7:
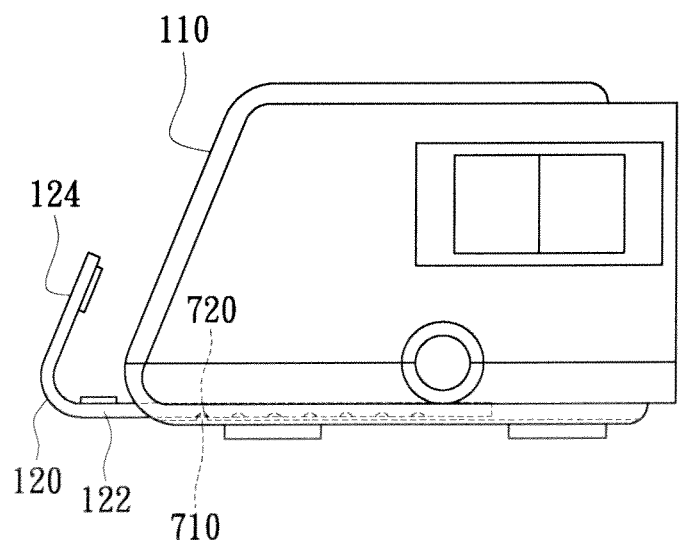
FIG. 7 shows a diagram of the positioning mechanism according to another embodiment of the present invention.

Refer next to FIG. 6, wherein a diagram of the positioning mechanism according to another embodiment of the present invention is shown. The positioning mechanism can be composed of multiple positioning teeth 610 and a positioning claw 650, in which the plurality of positioning teeth 610 are installed on the sliding end 122 and the corresponding positioning claw 650 is installed on the main body 110 so as to interfere with the positioning teeth 610. When the positioning claw 650 moves laterally and the interference with the positioning claw 650 is released, the sliding end 122 can slide freely; when the positioning claw 650 moves over the top of the sliding end 122 and clamps between the positioning teeth 610, the sliding end 122 may not move outwardly. In addition, the positioning mechanism can be also implemented by using the ratchet and the clutch (not shown), in which the sliding end 122 is used to drive the ratchet which can be interfered by means of the clutch. Besides, it is also possible to use the design of bumps and recesses to emmain body the positioning mechanism, as depicted in FIG. 7, wherein a diagram of the positioning mechanism according to another embodiment of the present invention is shown. At the bottom of the sliding end 122 a plurality of spherical recesses 720 are installed, while a spherical bump 710 is installed at the bottom of the sliding track in the main body 110. As the sliding end 122 moving to a corresponding position, the spherical bump 710 may embedded into one of the spherical recesses 720 so as to achieve the effect of positioning. It should be noted that since the positioning mechanism can be realized in several ways, the present invention is hence not limited to any of the aforementioned approaches.

Second Embodiment

Figure 8:
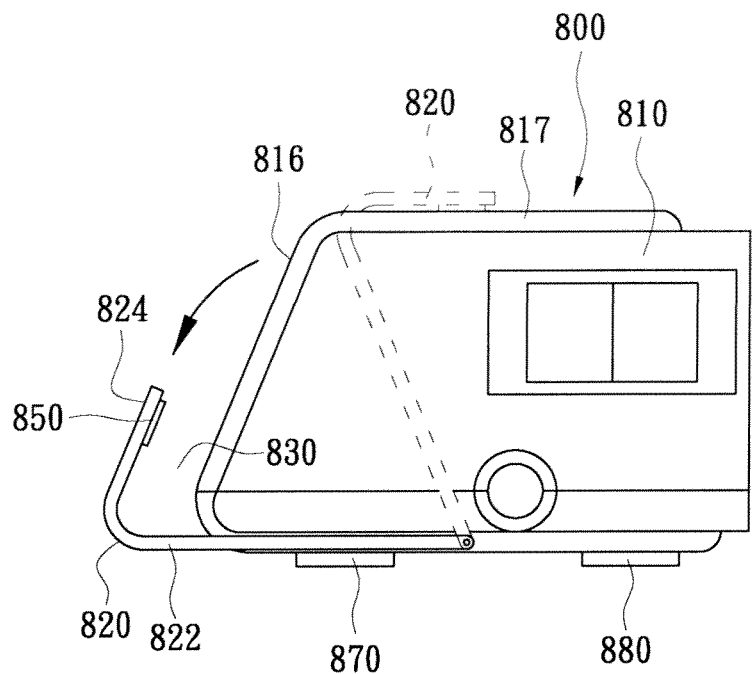
FIG. 8 shows a diagram of a power socket according to a second embodiment of the present invention.

Refer next to FIG. 8, wherein a diagram of a power socket according to a second embodiment of the present invention is shown. The power socket 800 comprises a main body 810 and a holding arm 820. The main body 810 has at least one power hole and at least one charging interface, as shown in FIG. 1. The holding arm 820 has two sideboards 822 respectively installed in pivot on two sides of the main body 810. The holding arm 820 can rotate between the top 817 and the side 816 of the main body 810, and when the holding arm 820 rotates to the side 816, the fixed end 824 of the holding arm 820 defines a containing slot 830 together with the side 816 of the main body 810. When the holding arm 820 rotates to the top 817, the fixed end 824 of the holding arm 820 attaches to the top 817 of the main body thereby facilitating user's storage in fold.

The side 816 of the main body 810 and fixed end 824 of the holding arm 820 both are slant planes for facilitating convenient placement of the portable electronic device by the user, as previously shown in FIGS. 2-3B, and the descriptions for which are herein omitted for clarity. The inner sidewall or bottom of the holding arm 820 can be installed with a cushion 850 for protection of the portable electronic device, and the bottom of the main body 810 can be installed with an anti-skid pad 870, 880. The number, shape and material of said cushions and anti-skids are not limited in the present embodiment.

Third Embodiment

Figure 9:
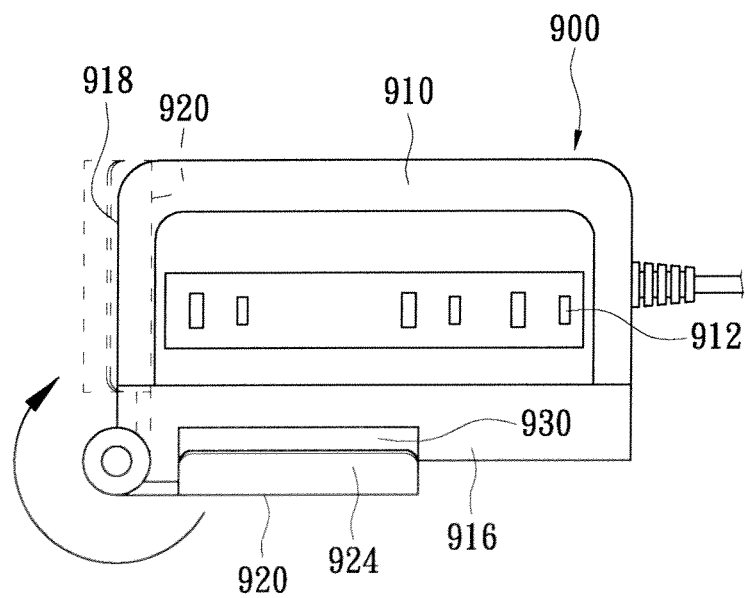
FIG. 9 shows a diagram of a power socket according to a third embodiment of the present invention.

Refer subsequently to FIG. 9, wherein a diagram of a power socket according to a third embodiment of the present invention is shown. The power socket 900 comprises a main body 910 and a holding arm 920. The main body 910 has at least one power hole 912 and at least one charging interface (not shown), as shown in FIG. 1, and the descriptions for which are herein omitted for clarity. The holding arm 920 is rotatably installed in pivot on one side of the main body 910, and can rotate between a first side 916 and a second side 918 of the main body 910; when the holding arm 920 rotates to the first side 916 of the main body 910, the fixed end 924 of the holding arm 920 can form a containing slot 930 together with the first side 916 of the main body 910 thereby allowing the user to place a portable electronic device. As the holding arm 920 rotates to the second side 918 of the main body 910, the fixed end 924 of the holding arm 920 attaches to the second side of the main body 910 thereby facilitating user's storage in fold.

In the present embodiment, the first side 916 of the main body 910 and the fixed end 924 of the holding arm 210 are both slant planes, thus upon disposing a portable electronic device in the containing slot 930, it may slightly tilt backward thereby facilitating the user's viewings and operations. The inner sidewall or bottom of the holding arm 920 can be installed with a cushion for protection of the portable electronic device, and the bottom of the power socket can be installed with an anti-skid pad (not shown).

Furthermore, it should be noted that the technical means of the aforementioned embodiments may be conjunctively applied or separately used, and the present invention is not limited thereto. In accordance with the above-said descriptions of the embodiments, those skilled ones in relevant arts can certainly deduce other potential implementations, and the descriptions for which are herein omitted for clarity.

It will be apparent to those skilled in the art that various modifications and variations can be made to the structure of the present invention without departing from the scope of the invention. In view of the foregoing, it is intended that the present invention cover modifications and variations of this invention provided they fall within the scope of the following claims and their equivalents.

What is claimed is:

1. A power socket having flexible holding arm, comprising:
   a main body having at least one power hole and at least one charging interface; and
   a holding arm, wherein one fixed end of the holding arm and one side of the main body define a containing slot suitable for placing a portable electronic device;
   wherein the containing slot has two opposite open ends and an inner sidewall, and the side is formed by extending the front edge of bottom in the main body toward the front edge of top in the main body, and the front edge of bottom in the main body protrudes outwardly relative to the front edge of top in the main body such that the side becomes a slant plane.

2. The power socket according to claim 1, wherein the holding arm is slidably installed on the main body, the position of the fixed end is adjusted by selectively sliding the holding arm outwardly or inwardly, the height of the side is greater than the height of the fixed end, and the side is a slant plane such that the portable electronic device placed in the containing slot inclines toward the side and leans against the side, and a bottom of the holding arm is installed with at least a cushion, and the bottom of the main body is installed with an anti-skid pad.

3. The power socket according to claim 1, wherein the holding arm has a sliding end which is slidably disposed in the main body, a plurality of positioning holes are installed on the sliding end and a corresponding positioning element is installed in the main body for embedding into one of the plurality of positioning holes.

4. The power socket according to claim 1, wherein the holding arm has a sliding end slidably disposed in the main body, a plurality of positioning teeth are installed on the sliding end and a corresponding positioning claw is installed in the main body for interference with such positioning teeth.

5. The power socket according to claim 1, wherein the main body includes a push-push typed positioning mechanism for positioning the holding arm.

6. A power socket having flexible holding arm, comprising:
   a main body having at least one power hole and at least one charging interface; and
   a holding arm having a first sideboard and a second sideboard, in which the first sideboard and the second sideboard are respectively pivoted to two sides of the main body, the rotating range of the holding arm is limited between a top and a side of the main body, and when the holding arm rotates to the side, one fixed end of the holding arm and the side of the main body together define a containing slot for placing a portable electronic device;
   wherein the containing slot has two opposite open ends and an inner sidewall, and the side is formed by extending the front edge of bottom in the main body toward the front edge of top in the main body, and the front edge of bottom in the main body protrudes outwardly relative to the front edge of top in the main body such that the side becomes a slant plane.

7. The power socket according to claim 6, wherein the fixed end of the holding arm is a slant plane, an inner sidewall or a bottom of the holding arm is installed with at least a cushion, and the bottom of the main body is installed with an anti-skid pad.

8. The power socket according to claim 6, wherein, when the holding arm rotates to the top, the fixed end of the holding arm attaches to the top of the main body.

9. A power socket having flexible holding arm, comprising:
a main body having at least one power hole and at least one charging interface; and
a holding arm rotatably pivoted to one side of the main body, wherein the rotating range of the holding arm is limited between a first side and a second side of the main body, and when the holding arm rotates to the first side of the main body, one fixed end of the holding arm and the first side of the main body define a containing slot suitable for placing a portable electronic device;
wherein the containing slot has two opposite open ends and an inner sidewall, and the side is formed by extending the front edge of bottom in the main body toward the front edge of top in the main body, and the front edge of bottom in the main body protrudes outwardly relative to the front edge of top in the main body such that the side becomes a slant plane.

10. The power socket according to claim 9, wherein the fixed end of the holding arm is a slant plane, an inner sidewall or a bottom of the holding arm is installed with at least a cushion, the bottom of the main body is installed with an anti-skid pad, and, when the holding arm rotates to the second side of the main body, the fixed end of the holding arm attaches to the second side of the main body.

* * * * *